F. FERGUSON.
HAND CART DEVICE.
APPLICATION FILED MAR. 26, 1910.

981,988.

Patented Jan. 17, 1911.
2 SHEETS—SHEET 1.

Inventor
Frank Ferguson,

Witnesses

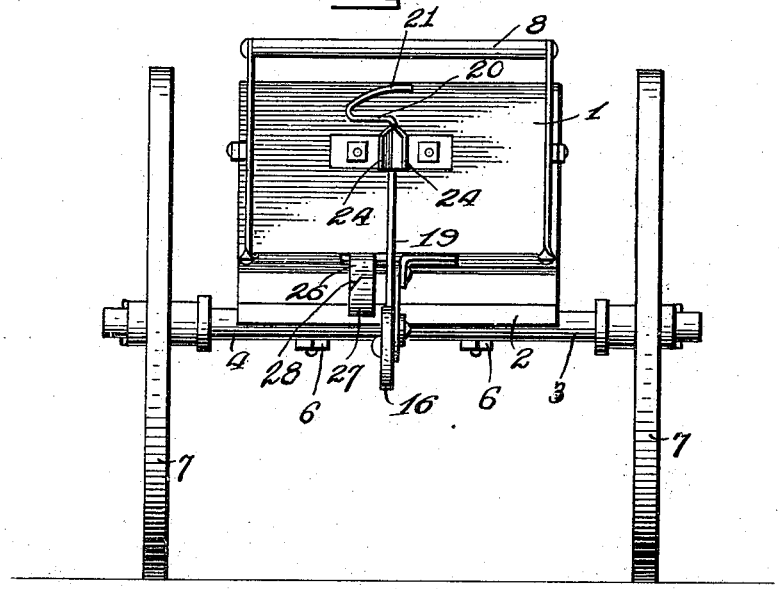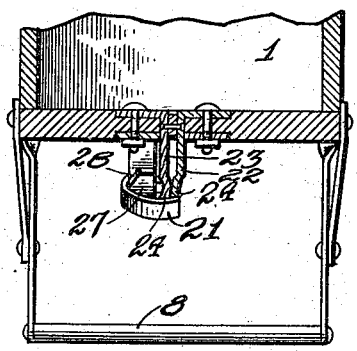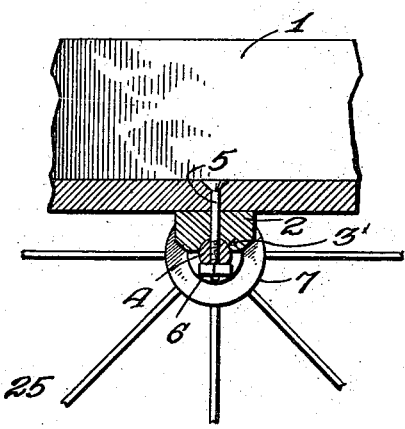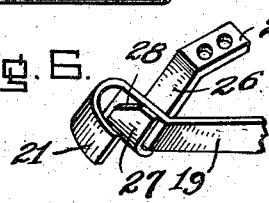

UNITED STATES PATENT OFFICE.

FRANK FERGUSON, OF WASHINGTON, IOWA.

HAND-CART DEVICE.

981,988. Specification of Letters Patent. Patented Jan. 17, 1911.

Application filed March 26, 1910. Serial No. 551,747.

*To all whom it may concern:*

Be it known that I, FRANK FERGUSON, a citizen of the United States of America, residing at Washington, in the county of Washington and State of Iowa, have invented certain new and useful Improvements in Hand-Cart Devices, of which the following is a specification, reference being had therein to the accompanying drawing.

This invention relates to hand carts of the two wheel type, and the principal object of the same is to provide novel means for supporting the ends of the cart so that the cart will not upturn, said supporting means being adjustably connected to the cart and operated by a lever at the rear end of the cart, means being provided for holding the operating lever in a position to retain the supports raised or in a position to retain the supports lowered.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1:
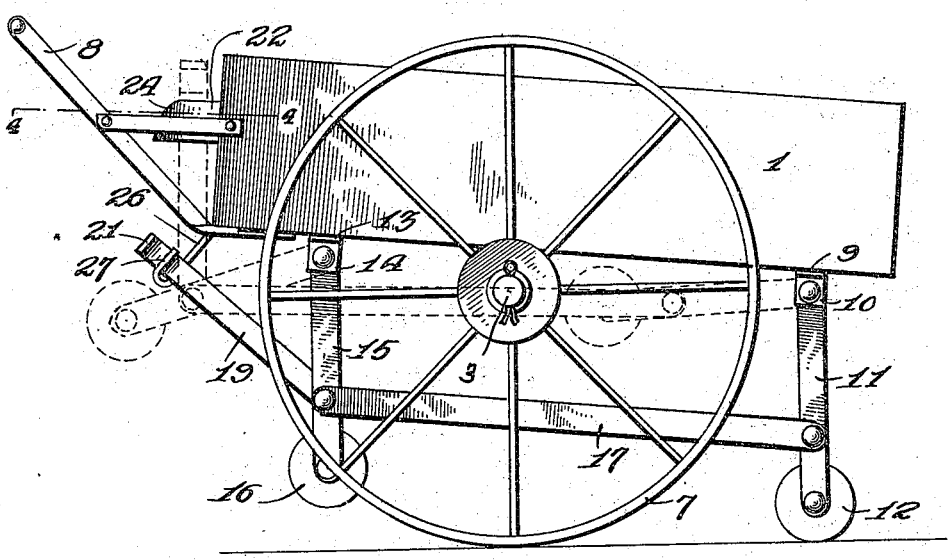
Figure 2:
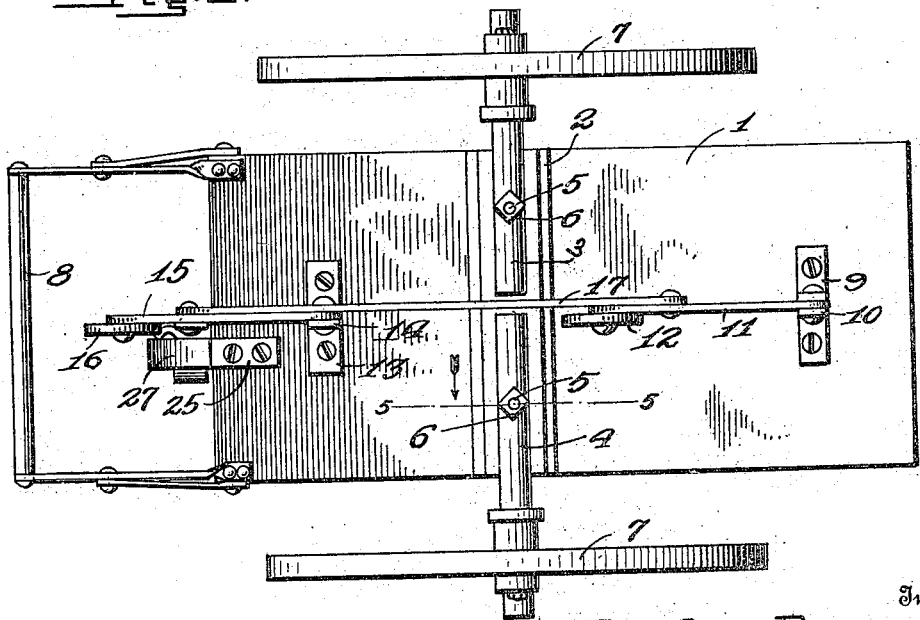

Figure 1 is a view in side elevation of a hand cart equipped with the improved end supports. Fig. 2 is a bottom plan view. Fig. 3 is an end view. Fig. 4 is a horizontal sectional view taken on the line 4—4, Fig. 1. Fig. 5 is a vertical sectional view taken on the line 5—5, Fig. 2. Fig. 6 is a detail perspective view of the handle end of the operating lever and a bracket for holding the same in one position.

Referring to the accompanying drawings by numerals, 1 designates the body of the improved hand cart which has a transversely arranged centrally located axle bolster 2 on its bottom. Said bolster is provided with a longitudinally extending concaved seat 3'. Axles 3—4 are fastened to the seat 3' of said bolster by the bolts 5 and nut 6, said axles projecting beyond opposite sides of the body and each provided with a wheel 7. The inner ends of said axles are spaced. A handle 8 is provided for the rear end of body 1.

A plate 9 is fastened to the center of the front portion of the undersurface of the bottom of body 1, said plate provided with a pendent ear 10 to which one end of an arm 11 is pivoted. The other end of said arm is provided with a roller 12. The other end portion of the bottom of body 1 is similarly provided with a plate 13, ear 14, arm 15 and roller 16, said arms 11 and 15 being connected by the elongated link 17 the ends of which are pivotally connected to said arms. An operating lever 19 has one end pivotally connected to arm 15 said lever having its free end portion bent at right angles to provide a latching lip 20 and terminating in a handgrip 21 that overhangs said lip in spaced relation.

The rear end of body 1 is provided with a pair of outwardly projecting relatively spaced parallel spring arms 22—23 the outer end portions of which are crimped together and terminate in flaring divergent ends 24 which serve as guides for lever 19 which passes between said arms and is held therebetween by lip 20 which seats upon one of the arms so that the supporting rollers 12 and 16 will be retained in a raised position, as is indicated by dotted lines in Fig. 1. A catch for holding the lever 19 in position to retain the rollers 12—16 in supporting position is also carried by the rear end of the body 1. Said catch is preferably formed of a single length of material having one end 25 suitably fastened to the undersurface of the central portion of body 1 at its rear end, the body 26 of said catch projecting beyond the rear end of the cart and being downwardly inclined. The outer end of said body 26 is upturned and bent over said body in spaced parallel relation forming a keeper 27 which receives and holds lip 20 of lever 19 when said lever is rocked to swing rollers 12—16 to a supporting position. Preferably the free end of the keeper 27 is beveled, as indicated at 28, so that it will guide the lip 20 to a position within the keeper.

It will be seen from the foregoing that the supporting rollers may be readily swung to a raised or lowered position by means of lever 19, and that said lever may be retained in either position by attaching the same to the spring arms or the catch. It will also be understood that while the supporting rollers are of especial value for preventing the body overturning while being loaded, they may be used while the cart is being transported and will be of value in the event of heavy loads being transported.

What I claim as my invention is:—

1. A hand cart comprising a body, wheels therefor, a pivoted pendent arm at the front and rear of the bottom of said body, a supporting roller for each arm, a link pivotally connecting said arms, an operating lever pivotally connected to the rear arm, a catch projecting from the rear of the body for retaining said lever in position to lower said arms, and spring arms also carried by the rear of said body for retaining said lever in position to elevate said arms.

2. A hand cart comprising a body, wheels therefor, supporting arms pivotally connected to the ends of said cart, a roller for each arm, a link pivotally connecting said arms, an operating lever pivotally connected to one arm and provided with an angular latching lip at its free end, a catch projecting from the rear end of said body and provided with an upturned keeper for the reception of said lip to hold said lever in position to lower said arms, said keeper provided with means for guiding the latching lip thereto, and means also carried by said body for holding said lever in position to elevate said arms.

3. A hand cart comprising a body, wheels therefor, an arm pivotally connected to each end portion of said body, a roller for the free end of each arm, means connecting said arms to cause them to swing together, an operating lever pivotally connected to one arm, a pair of spring arms provided with flaring free ends adapted to receive said lever between them when said arms are elevated, and means also carried by said rear end of the body for holding said lever when the arms are swung to a lowered position.

In testimony whereof I hereunto affix my signature in presence of two witnesses.

FRANK FERGUSON.

Witnesses:
  W. H. SMITH,
  JOHN C. LITTLE.